United States Patent [19]

Kincs et al.

[11] Patent Number: 5,395,638
[45] Date of Patent: Mar. 7, 1995

[54] REDUCED FAT ROLL-IN BAKING COMPOSITIONS AND BAKED GOODS

[75] Inventors: Frank R. Kincs, Bradley; Melvin P. Minor, Momence, both of Ill.

[73] Assignee: Bunge Foods Corporation, Bradley, Ill.

[21] Appl. No.: 89,711

[22] Filed: Jul. 9, 1993

[51] Int. Cl.$^6$ .............................................. A21D 13/08
[52] U.S. Cl. ........................................ 426/556; 426/94; 426/602; 426/603; 426/604; 426/606; 426/607; 426/611; 426/615; 426/654
[58] Field of Search ................ 426/94, 556, 602, 603, 426/604, 606, 607, 611, 615, 654

[56] References Cited

U.S. PATENT DOCUMENTS

| | | | |
|---|---|---|---|
| 3,585,046 | 6/1971 | Schaible et al. | 99/93 |
| 5,039,544 | 8/1991 | Lansbergen et al. | 426/556 |
| 5,098,728 | 3/1992 | Singer et al. | 426/603 |
| 5,158,798 | 10/1992 | Fung et al. | 426/604 |
| 5,182,123 | 1/1993 | Edo et al. | 426/19 |

FOREIGN PATENT DOCUMENTS 9114371 10/1991 WIPO ................................ 426/556

*Primary Examiner*—Helen Pratt
*Attorney, Agent, or Firm*—Lockwood, Alex, Fitzgibbon & Cummings

[57] ABSTRACT

Bakery compositions and baked goods which have taste and organoleptic properties equal to or superior to the same types of products prepared in accordance with traditional, full fat formulations, have substantially reduced fat contents. One or both of a dough formulation and a roll-in spread positioned between layers of the rolled dough formulation have substantially reduced fat contents. A fat substitute which is substantially fat free or contains only very low levels of fat is incorporated into either or both of the dough formulation and of the roll-in formulation.

24 Claims, No Drawings

REDUCED FAT ROLL-IN BAKING COMPOSITIONS AND BAKED GOODS

BACKGROUND AND DESCRIPTION OF THE INVENTION

This invention relates to reduced fat baking products, more particularly to a reduced fat roll-in-shortening spread, a combined dough and roll-in-spread composition which exhibits a reduced fat content, reduced fat doughs such as sweet dough compositions, and baked products made therefrom. A fat substitute is included within the roll-in spread composition according to the invention, and the total amount of shortening typically included within these types of products is reduced substantially. Shortening can be completely eliminated from the dough formulation which makes up the dough component of the combined dough and roll-in spread composition, which combined product has reduced fat roll-in shortening spread generally between layers of the dough.

Composite laminated doughs are known to be prepared by wrapping a fat such as butter or margarine in a rolled dough to thereby form a dough/fat/dough structure and folding it in such a manner as to form a multi-layered structure. When baked in an oven, the laminated dough having the alternate structure of dough and fat layers produces a confectionery product having a laminated or flaked structure. Exemplary confectionery products in this regard include sweet rolls, croissants and the like.

One of the characteristics of these types of products is that they exhibit puffing properties or a "pop" when baked such that there is a separation between the dough layers. These products are characterized by their puffed-up appearance and delicate eating attributes. Often these doughs also include leavening components such as yeast and baking powder. Over the years, it has come to be appreciated that the fat component is important in achieving excellent "pop" and eating characteristics. Properties such as excellent extensibility and viscoelasticity are types of properties of the fat or shortening which are believed to be important to achieving these desirable characteristics of these types of baked products. Often, these shortenings or fats are butter or in the nature of margarines, which by definition have an oil content of at least 80 percent by weight.

Typically, these roll-in products have numerous layers, for example from 50 to 250 or more layers of dough and roll-in shortening spread which help to give these products their distinctive attributes that provide the perception of a light and flaky and carefully prepared product. Although these types of products are desirable from an organoleptic perspective, particularly in view of their delicate consistency and attractive taste, they may not meet the criteria of individuals who, by choice or by dietary restrictions, wish to limit the intake of fat or shortening. Often, typical sweet dough roll-in-shortening products have a fat content of on the order of approximately 25 to 35 weight percent.

Attempts have been made to provide products utilizing the multi-layered roll-in spread concept modified to eliminate or substantially eliminate any fat, shortening, butter or margarine component. It has now been found that these types of attempts are not satisfactory, primarily because the product is too stiff to be suitable for use in these types of multi-layered products. When it is possible to prepare fat-free or substantially fat-free roll-in baked goods, they do not exhibit the eating qualities important to these goods.

Other approaches which have met with some success, typically for goods less delicate than these types of roll-in goods, have substituted traditional high fat content fats, shortenings, butter or margarines with non-fat substitutes such as gums, agar, carrageenan and the like with water. The result is a product not suitable in eating quality for a roll-in baked good because these types of formulations use water tied up in gums or the like to give an impression of fattiness without necessarily replicating organoleptic qualities.

In accordance with the present invention, roll-in-bake products are provided which contain a minimum of 30 percent to 40 percent less fat, while still exhibiting the exceptional flakiness and desirable eating quality which are characteristic of high fat roll-in baked products. The reduced fat roll-in shortening spread according to the invention includes a relatively low amount of a fat substitute, a substantially reduced amount of fat, as well as water and emulsifiers. The reduced fat roll-in spread is combined with a dough formulation by being positioned between layers of the dough. Upon baking of this combined composition, a product such as a Danish-style sweet roll or a croissant is provided.

It is a general object of the present invention to provide an improved roll-in-shortening spread which is substantially reduced in fat content.

Another object of the present invention is to provide improved reduced fat roll-in bakery compositions and baked goods which incorporate a non-fat fat substitute.

Another object of this invention is to provide improved baked goods containing a minimum of 30% to 40% less fat than traditional baked goods while maintaining desired flakiness and eating quality.

Another object of the present invention is to provide improved reduced fat baked goods, dough and/or roll-in compositions that exhibit a better "pop" when baked and provide greater separation between layers to imbue the baked goods with an excellent flaky consistency.

Another object of the present invention is to provide reduced fat baked products and bakery compositions which incorporate low-to-moderate levels of fat substitutes such as Simplesse (registered trademark) in combination with reduced levels of fat, shortening or margarine.

Another object of this invention is to provide an improved reduced fat roll-in shortening spread which, when used in baking multi-layered sweet dough bakery products provides a product which is of improved eating quality and extends the length of time that the baked product remains moist, resulting in a product which tends to be perceived as being fresh for a longer time.

Another object of the present invention is to provide an improved reduced fat roll-in shortening spread wherein a significant proportion of the fat is replaced by a combination of water, an emulsifier system and a non-fat fat substitute.

Another object of this invention is to provide roll-in baking formulations wherein shortening is totally replaced in the dough phase with a fat substitute, which can be added successfully to either the dough phase or the roll-in spread containing reduced levels of shortening.

Another object of this invention is to form a reduced-fat roll-in dough and spread which has excellent extensibility and viscoelasticity suitable for rolling and folding by rolling pins and reverse sheeter machines.

These and other objects, features and advantages of the present invention will be clearly understood through a consideration of the following detailed description.

DESCRIPTION OF THE PARTICULAR EMBODIMENTS

Bakery products such as sweet dough Danish pastry and croissants are leavened dough products having many layers of high quality leavened dough separated by films of shortening. Adjacent ones of the multiple layers of sweet dough are generally separated by films of reduced fat roll-in shortening spread. It is important that the reduced fat roll-in shortening spread resist absorption into the dough in order to bring about maximum "pop" to provide a baked product having the desired multi-layered flakiness which is characteristic of full fat roll-in shortening baked products. In accordance with the present invention, the reduced fat roll-in shortening spread effects dough layer separation upon baking in a manner that is commensurate with, if not superior to, that achieved by full fat roll-in shortenings with the further advantage of providing a bakery product which is of substantially reduced fat content.

The reduced fat roll-in shortening spread in accordance with the present invention is typically formulated as an oil soluble phase and a water soluble phase, which phases are then combined to produce the reduced fat roll-in shortening spread. Generally speaking, the oil soluble phase makes up approximately 50 to 70% of the shortening spread, while the water soluble phase makes up approximately 30 to 50% of the shortening spread, both based upon the total weight of the reduced fat roll-in shortening spread.

The principal component of the oil soluble phase is a shortening or fat component, which is present at levels lower than the shortening or fat present in full fat roll-in-shortening spreads. Typically, the shortening component of the roll-in shortening spread makes up less than 65% of the reduced fat roll-in shortening spread, a typical range being between about 48 and about 65 weight percent, based upon the total weight of the shortening spread composition.

Water is the principal component of the water soluble phase. Increasing the water content in the roll-in shortening spread in accordance with the present invention when compared with full fat spreads cooperates with the rest of the formulation to enable the reduction in the total fat content of the roll-in spread. A balance must reached, due in large measure to solubility limitations. Generally speaking, the lower the amount of water present, the greater the solubility between the oil soluble phase and the water soluble phase and, hence, the greater resistance to phase separation during separation and use. The reduced fat roll-in shortening spreads will readily accommodate at least 30% by weight of water. A typical range of water within the shortening spread is between about 30 and about 47 weight percent water, based upon the total weight of the shortening spread composition.

It is preferred that the no-fat fat substitute be introduced into the reduced fat roll-in shortening spread through the water soluble phase. Other typical ingredients of the water soluble phase include salt, present primarily for flavoring reasons, and suitable preservatives present particularly for mold prevention purposes. Generally speaking, the fat substitute will be present at levels of between about 0.5 and about 4% by weight, the salt or the like will be present at about 0.5 to about 5% by weight, and the preservative or preservatives will be present at a level of between about 0.01 and about 0.5 percent by weight, all based upon the total weight of the reduced fat roll-in shortening spread.

An emulsifier system, which is an important aspect of the invention, is typically introduced into the shortening spread by way of the oil soluble phase. In a typical arrangement, the emulsifier system makes up about 0.5 to about 5% by weight of the reduced fat roll-in shortening spread. Often, suitable coloring and/or flavoring agents are included, typically added by way the oil soluble phase, at levels of between about 0.01 and about 0.1% by weight, based upon the total weight of the reduced fat roll-in shortening spread.

Preferred characteristics of the shortening component or fat component of the oil soluble phase include having a melting point (Mettler) of between about 103° F. and about 122° F., depending somewhat upon the formulation of the dough, such as whether it is a sweet dough or a puff pastry dough, with which the reduced fat shortening spread is combined in order to make the roll-in baked product. Other characteristics include a solids fat index (SFI) profile substantially along the lines of the following:

|  | Sweet Dough | Puff Pastry | Overall |
|---|---|---|---|
| SFI at 50° F. | 19–29 | 30–40 | 19–40 |
| SFI at 70° F. | 16–25 | 26–34 | 16–34 |
| SFI at 80° F. | 14–22 | 25–33 | 14–33 |
| SFI at 92° F. | 8–16 | 17–27 | 8–27 |
| SFI at 104° F. | (0)–8 | (0)–18 | (0)–18 |

With further reference to the melting characteristics of the shortening component or fat component of the oil soluble phase, preferred melting point temperature ranges will vary somewhat depending upon the makeup of the dough formulation with which the reduced fat roll-in-shortening spread is to be used. For example, for a typical sweet dough formulation, the Mettler melting point should be between about 103° F. and about 113° F. For a puff pastry dough, the Mettler melting point should be between about 118° F. and about 122° F.

Preferably, the shortening component or fat component will include significant quantities of fat that is of the beta prime ($\beta'$) tending type. Typical $\beta'$ tending fats are more structured than beta ($\beta$) tending fats. Exemplary $\beta'$ tending fats are hydrogenated or partially hydrogenated cottonseed oil, tallow, palm oil and the like. The $\beta'$ tending fat could also be a blend of such partially hydrogenated fats with such hydrogenated fats. The remainder of the shortening component or fat component of the oil soluble phase will be one or more $\beta$ tending fats. Exemplary $\beta$ tending fats are hydrogenated or partially hydrogenated soybean oil, corn oil, peanut oil, canola oil, or the like, or blends of any such $\beta$ tending fats. Especially preferred is a fat system that is a blend of about 10 to about 30%, preferably to about 25% by weight of $\beta'$ tending fat and the remainder substantially all $\beta$ tending fats. Also possible is a fat component which is entirely $\beta'$ tending fat.

The makeup of the fat component blend can vary somewhat depending upon the dough formulation with which it is intended to be used. For a typical sweet dough formulation, the fat component of the oil soluble phase should have between about 10 and about 25% by weight of β' fat or fats, preferably between about 14 and about 20% by weight, based upon the total weight of the fat component, the balance being β tending fat or fats. When the reduced fat roll-in shortening spread is intended for use with a puff pastry dough, the fat component should include about 10 to about 100%, preferably between about 15 and about 30% by weight, of the β' tending fat or fats, with the balance being the β tending fat or fats, all based upon the total weight of the fat component. Without regard to the particular dough with which the roll-in shortening spread is to be used, the fat component has about 2 to about 100%, preferably between about 12 to about 35% by weight, most preferably between about 14 and about 30% by weight, of β' tending fat or fats, the remainder being β tending fat or fats, all based upon the total weight of the fat component or shortening component.

Concerning the fat substitutes, they will typically have very low levels of fat to provide a component that is virtually fat-free. These types of products are generally referred to herein as no-fat fat substitutes or simply fat substitutes. Exemplary and preferred fat substitutes in this regard are whey protein concentrates, oat fiber derivatives having a high bran content, and the like. It is important that the fat substitute be suitable for use in baked products. The fat substitute should not be of a type which would be effected detrimentally by baking conditions, such as components which can denature when subjected to baking temperatures.

Especially preferred fat substitutes are the Simplesse (registered trademark) fat substitutes currently marketed by The NutraSweet Company. An especially suitable product is Simplesse Dry 100. This product is a whey protein concentrate that is a white to cream colored free-flowing powder. Its flavor is that of mild cooked, processed milk. This product readily hydrates. Prior to hydration, it has a moisture content of less than 4%, a protein content of 53.5±2 weight percent, a fat content of less than 4.5 weight percent, a lactose content of less than 30 weight percent and an ash content of less than 7 weight percent, all based upon the total weight of the whey protein concentrate powder. The powder has a fineness such that 98% of the powder passes through a 40 mesh screen. An exemplary oat fiber derivative product is Oat Trim (trademark), currently available from ConAgra. The fat substitute is present at a level between about 0.5 to about 4% by weight, preferably less than about 3% by weight, and most preferably between about 0.5 and about 2% 20 by weight, based upon the total weight of the reduced fat roll-in-shortening spread.

With further reference to the emulsifier or emulsifier system which is a component of the reduced fat roll-in-shortening spread, this is provided in order to form a proper and stable water-in-oil emulsion. It is desirable that the reduced fat roll-in shortening spread exhibit no syneresis and that the water in the composition remain bound all throughout the reduced fat roll-in shortening spread. Especially hydrophilic emulsifiers are suitable, such as polyoxyethylene sorbitan monostearate, for example Polysorbate 60 (trademark) and Polysorbate 80, polyglycerol esters of monoglyceride and diglyceride blends, such as TGMSH, and monoglyceride esters. Less hydrophilic emulsifiers such as lecithin can be also be used, particularly in combination with other more hydrophilic emulsifiers. Typically, the total amount of the emulsifier or emulsifier system present within the reduced fat roll-in-shortening spread is between about 0.5 to about 5% by weight, preferably between about 0.8 and about 3% by weight. When a two-component emulsifier system including lecithin is incorporated, the weight ratio of lecithin to the more hydrophilic emulsifiers such as a monoglyceride ranges between about 0.5:1 to about 2:1. The preferred ratio is on the order of about 1:1 and depends somewhat upon the particular more hydrophilic emulsifier which is used.

Votation process conditions are preferably utilized and maintained in order to combine the various components of the reduced fat roll-in shortening spread into a syneresis-resistant shortening spread type of product. Preferably the oil soluble phase and water soluble phase are blended together and run through a Votator (trademark) chilling blender. It is believed that the emulsifier system as discussed herein contributes to proper formation of the water-in-oil emulsion which is characteristic of the reduced fat roll-in shortening spread of the invention. In a sense, the overall system allows the replacement of some of the shortening component or fat component with water, the extra water being emulsified into the spread together with the fat substitute. The result is a product having at least 30% less fat than a typical full fat roll-in shortening spread, while exhibiting the needed flakiness and organoleptic qualities of the full-fat product. The reduced fat roll-in shortening spread has been found to positively affect the volume, flakiness and desired toughness attributes of the finished baked multi-layered products within which it is incorporated as a roll-in component. It also exhibits good-to-excellent extensibility and viscoelasticity and withstands the rolling and folding to which roll-in formulations all subjected.

Concerning the combined dough and roll-in spread product in accordance with this invention, the dough layers account for between about 64 and about 85% by weight, preferably between about 67 and about 79% by weight, of the total combined dough and roll-in spread product ready for baking. The roll-in shortening spread component makes up the balance, or between about 15 and about 36% by weight, preferably between about 21 and about 33% by weight, based upon the total combined product ready for baking.

The doughs are of a type that are formulated for roll-in baked products, such as Danish-style rolls, croissants, puff pastries and the like. Some of these doughs are characterized as sweet doughs, usually leavened sweet doughs. In an important aspect of this invention, the baker is allowed to start with a dough that has no fat or virtually no fat. The baker can then rely upon the already reduced fat content of the reduced fat roll-in shortening spread in order to provide the desired texture and organoleptic properties for the finished, baked product. Generally speaking, the dough formulations contemplated for use in connection with the invention will "work" well during such procedures as kneading, rolling, folding and the like which are characteristic of a traditionally prepared roll-in baked product. Generally speaking, these dough formulations can have a shortening component or fat component content of from zero up to about 15% by weight, based upon the total weight of the dough formulation. It is also possible, although not preferred, to blend some or all of the fat substitute of the combined dough and shortening spread product into the dough formulation. In this instance, a dry form fat substitute typically would be incorporated with the water or the water soluble phase of the dough formulation.

Typical dough formulations suitable for use in accordance with the present invention will include between about 40 and about 50% by weight of flour or flour blends, between about 2 and about 10% by weight of granulated sugar or equivalent at a weight percentage suitable therefor, between about 5 and about 15% by weight of eggs or between about 0.2 and about 1% by weight of dry whole eggs, or egg substitute, between about 0.5 and about 4% by weight of non-fat dry milk or substitute, between about 0.2 and about 2% by weight table salt or substitute, between about 15 and about 30% by weight of water (some of which may be added as ice), between about 0.5 and about 4% by weight of dry yeast, and between about zero and about 3% by weight of baking powder.

These percentages will vary somewhat depending upon the particular baked product being made. For example, a suitable Danish-type sweet dough formulation will have about 48% flour, about 5.5% sugar, about 10.5% whole eggs, about 2% non-fat dry milk, about 1% salt, about 23% water, about 2% dry yeast and (optionally) up to about 8% vegetable-based shortening or fat, all weight percents based upon the total weight of the dough formulation. An exemplary croissant sweet dough formulation includes about 54% bread flour, about 5.5% sugar, about 5% dry whole eggs, about 2% non-fat dry milk, about 1% salt, about 30% water, about 2% dry yeast, about 1.5% baking powder and up to about 3.5% vegetable-based fat or shortening, all percents by weight based upon the total weight of croissant flour formulation.

As a typical procedure for making a baked roll-in product, the dough is kneaded and rolled. Interspersed layers of the reduced fat roll-in shortening spread are positioned in accordance with generally known procedures for folding over and rolling several times in order to prepare a combined rolled-in dough composition. This combined dough composition is typically folded over a few times and subjected to retard conditions during which the combined dough cools down and the yeast rises. Additional fold-over steps can then be practiced, and the procedure repeated to provide the ready-to-bake multi-layered composition. It is usually desirable to allow this composition to set overnight prior to actual baking. The composition will typically be shaped into a desired item, such as a croissant or sweet roll, usually followed by passage to a proof box having desired heat and humidity conditions in order to achieve the needed yeast development. Baking in a conventional oven at 365° F. to 375° F. for a few minutes provides the desired finished baked product.

It has been found that the roll-in dough products of the present invention are particularly workable and plastic and suitable for baking the types of roll-in products discussed herein. Baking experience is far superior to these types of products made from substantially fat-free roll-in shortening spreads, which are too stiff and do not impart adequate puffing properties and the organoleptic properties normally attributed to full-fat roll-in products. Additionally, the present invention results in baked roll-in style products that are organoleptically equivalent or superior to and which exhibit puffing properties at least as good as those of full fat formulations, this being accomplished while achieving a substantial reduction in total fat content. For example, a typical Danish-style product made from normal margarine has a fat content percentage of on the order of 30%. This is reduced on the order of about 30% to 40% or above by the present invention. A typical croissant product produced from normal margarine has a fat percentage of on the order of 23%, whereas a croissant produced in accordance with the invention has a fat content that is reduced by at least 30%. Generally, the total fat content in the reduced fat roll-in spread can be reduced to about 50 percent of a conventional roll-in spread, with the fat levels being about 50 to 60 weight percent of full-fat levels.

The following examples are illustrative of some of the aspects of the present invention.

EXAMPLE 1

A Danish-type dough was prepared in the following proportions: 1000 gms bread flour, 1000 gms pasta flour, 222 gms granulated sugar, 444 gms of eggs, 83 gms of non-fat dry milk, 41.6 gms of common table salt, 722 gms of water as ice, 83 gms of dry yeast in 249 gms of water, and 333 gms of Tri-Co (registered trademark) margarine available from Bunge Foods Corporation. This dough was rolled-in in the conventional manner with a margarine especially formulated for roll-in spread uses, namely Trophy (registered trademark) margarine available from Bunge Foods Corporation. The folded and rolled-in dough product had a Trophy content of 31.2%. The product was baked. As an average of 3 runs, the baked Danish rolls produced in accordance with this full fat formulation analyzed as having 30% fat and 15% moisture.

The same Danish-type dough was prepared, except this time omitting the Tri-Co shortening or fat and adding 1% by weight, based upon the total weight of the dough formulation, of Simplesse whey protein concentrate fat substitute. This dough formulation was combined with a low-fat spread in substantially the same manner as for the full fat product in order to produce the same type of Danish sweet rolls. This low-fat spread was composed of an oil soluble phase having 58% HL PY shortening (partially hydrogenated soybean oil and partially hydrogenated cottonseed oil), 0.8% lecithin, 1% monoglyceride (Dimodan OK from Grindstead), less than 0.1% beta carotene and flavoring, "votated" together with a water soluble phase composed of 37% water, 2% common table salt, and approximately 0.1% mold preservative (EDTA). All percentages are weight percentages based upon the total weight of the reduced fat roll-in shortening spread. After baking, analysis (average of 3 runs) indicated that the baked product had 17 weight percent fat and 23 weight percent moisture. This represents a fat reduction of 43.3% and a moisture increase of 53.3%.

EXAMPLE 2

Another Danish-type dough was prepared in accordance with the low-fat dough of Example 1, except the Simplesse fat substitute was omitted. The same reduced fat roll-in shortening spread was also prepared, except 1% Simplesse fat substitute was added to the roll-in shortening spread. The baked Danish sweet rolls analyzed to have a fat percentage of 18% by weight and a moisture percentage of 24% by weight. This represents a fat reduction of 40% over the full fat product of Example 1 and a moisture enhancement of 60% when compared with the full fat Danish of Example 1.

EXAMPLE 3

Croissants were produced from a full fat dough and roll-in combination as follows. The flour formulation included the following ingredients in accordance with the indicated formula: 2250 gms of bread flour, 225 gms of granulated sugar, 20.3 gms of dry whole egg, 90 gms of non-fat dry milk, 45 gms of salt, 975 gms of water, 85 gms of dry yeast in 259 gms of warm water, 54 gms of baking powder, and 151 gms of Vream (registered trademark) shortening available from Bunge Foods Corporation. This was combined with the full fat roll-in shortening spread as described in Example 1, the combined dough and roll-in spread being composed of about 68% dough and about 32% roll-in shortening spread. This dough combination was formed into croissants as generally described herein and baked. Analysis indicated the croissants contained 23% fat and 23% moisture.

The same croissant dough formula as discussed in this Example was rolled in with the reduced fat roll-in shortening spread of Example 2. Again, the ratio was 68 weight percent croissant dough and 32 weight percent roll-in shortening spread. Analysis after baking revealed a fat content of 15.5% and a moisture content of 27%. This represents a fat reduction when compared with the full-fat croissants of 32.6%, combined with a moisture enhancement of 17.4%.

EXAMPLE 4

A sweet dough formulation generally in accordance with Example 2 was prepared, except no fat component was included in the reduced fat roll-in shortening spread. In addition, the quantity of Simplesse fat substitute was more than tripled to in excess of 3%. The result was a baked product that was judged to be too stiff to be acceptable as a high quality sweet dough product.

EXAMPLE 5

Croissants prepared generally in accordance with Example 3 were evaluated by observation for their respective puffing properties. The reduced-fat croissants exhibited a greater separation between the layers, that is a higher "pop" when baked, to give an improved flaky consistency when compared with the full-fat croissants. Although not wishing to be bound by any theoretical considerations, it is believed that this enhanced puffing property may be due to the ability of the reduced fat system to hold the water longer before the water starts to release, thereby providing a better "pop." Also, the presence of the no-fat fat substitute has the advantage of reducing softening of the dough, which is especially beneficial in croissant formulations to enhance the "pop" characteristic visible on the top of the croissant.

EXAMPLE 6

Taste acceptance testing was conducted to compare croissants baked from a standard, full-fat croissant formula with croissants baked from a reduced-fat formulation in accordance with the invention. The two bakery or dough formulations were as follows:

|  | Full-Fat Dough (%) | Reduced-Fat Dough (%) |
| --- | --- | --- |
| Bread Flour | 100.0 | 100.0 |
| Gran. Sugar | 10.0 | 10.0 |

-continued

|  | Full-Fat Dough (%) | Reduced-Fat Dough (%) |
| --- | --- | --- |
| Non-Fat Dry Milk | 4.0 | 4.0 |
| Salt | 2.0 | 2.0 |
| Baking Powder | 2.4 | 2.4 |
| Dry Eggs | 0.9 | 0.9 |
| VREAM ® Shortening (100% fat) | 6.7 | — |
| Water | 20.0 | 20.0 |
| Yeast | 3.75 | 3.75 |
| Water | 43.3 | 43.3 |

The full-fat formulation was rolled in with margarine which was 80% oil or fat, while the roll-in used with the reduced-fat formulation was as specified in Example 1 hereof. All croissants were made in accordance with the same dough working and roll-in procedure, were baked at 390° F. and allowed to cool for 24 hours.

Full-fat and reduced-fat croissants were paneled blind, with a total of 79 panelists responding. Of these, 45 preferred the full-fat formulation croissants, 35 preferred the reduced-fat formulation croissants, and 2 had no preference. Statistically, at a 95% confidence level, 49 preferences were needed to indicate a difference between the two formulations. Therefore, the panel testing revealed no acceptance preference between the two formulations, and the reduced-fat formulation was comparable to the full-fat formulation.

It will be understood that the embodiments of the present invention which have been described are illustrative of some of the applications of the principles of the present invention. Numerous modifications may be made by those skill in the art without departing from the true spirit and scope of the invention.

We claim:

1. A reduced fat roll-in shortening spread having an oil soluble phase and a water soluble phase which are blended together;

wherein the oil soluble phase comprises between about 48 and about 65% by weight of shortening, based upon the total weight of the shortening spread, and between about 0.5 and about 5% by weight of emulsifier, based upon the total weight of the shortening spread; and wherein the water soluble phase comprises between about 30 and about 47% by weight of water, based upon the total weight of the shortening spread, and between about 0.5 and about 4% by weight of a fat substitute, based upon the total weight of the shortening spread, said fat substitute being selected from the group consisting of whey protein concentrates, oat fiber derivatives, and combinations thereof and having no more than about 5% by weight of fat, based upon the total weight of the fat substitute.

2. The reduced fat roll-in shortening spread in accordance with claim 1, wherein said fat substitute is present at between about 0.5 and about 2% by weight, based upon the total weight of the shortening spread.

3. The shortening spread in accordance with claim 1, wherein said shortening has a melting point of between about 103 and about 122° F. and has a solids fat index at 70° F. of between about 16 and about 34.

4. The shortening spread in accordance with claim 1, wherein said shortening component includes at least 2% by weight of beta prime tending fat, the balance being beta tending fat.

5. The shortening spread in accordance with claim 4, wherein the shortening component includes between about 10 and about 30% by weight of the beta prime tending fats.

6. The shortening spread in accordance with claim 1, wherein said emulsifier component is a water-in-oil emulsion combination of at least two different emulsifiers selected from the group consisting of lecithin and monoglycerides, the weight ratio of lecithin to monoglycerides being between about 0.5:1 and about 2:1.

7. The shortening spread in accordance with claim 1, wherein said shortening has at least 30% by weight less fat when compared to a full fat shortening spread which omits said fat substitute.

8. A reduced fat roll-in shortening spread comprising a blend of between about 48 and about 65% by weight of shortening, based upon the total weight of the shortening spread; between about 0.5 and about 5% by weight of emulsifier, based upon the total weight of the shortening spread; between about 30 and about 47% by weight of water, based upon the total weight of the shortening spread, and between about 0.5 and about 4% by weight of a fat substitute, based upon the total weight of the shortening spread, said fat substitute being selected from the group consisting of whey protein concentrates, oat fiber derivatives, and combinations thereof and having no more than about 5% by weight of fat, based upon the total weight of the fat substitute.

9. A combined reduced fat dough and roll-in shortening spread composition including layers of dough formulation having a roll-in shortening spread generally between layers of the dough, the combined composition comprising between about 64 and about 85% by weight of said dough formulation and between about 15 and about 36% by weight of said roll-in shortening spread, both based upon the total weight of combined dough and roll-in spread composition; and the roll-in shortening spread being a reduced fat roll-in shortening spread comprising between about 48 and about 65 percent by weight of shortening, based upon the total weight of the shortening spread; between about 0.5 and about 5% by weight of emulsifier, based upon the total weight of the shortening spread; between about 30 about 47% by weight of water, based upon the total weight of the shortening spread; and between about 0.5 and about 3 weight percent of a fat substitute, based upon the total weight of the shortening spread, said fat substitute being selected from the group consisting of whey protein concentrates, oat fiber derivatives, and combinations thereof and having no more than about 5% by weight of fat, based upon the total weight of the fat substitute.

10. The combined reduced fat dough and roll-in spread composition in accordance with claim 9, wherein said fat substitute is present at between about 0.5 and about 2% by weight, based upon the total weight of the shortening spread.

11. The combined reduced fat dough and roll, in spread composition in accordance with claim 9, wherein said shortening component includes at least 2% by weight of beta prime tending fat, the balance being beta tending fat.

12. The combined reduced fat dough and roll-in spread composition in accordance with claim 9, wherein the shortening component includes between about 10 and about 30% by weight of the beta prime tending fats.

13. The combined reduced fat dough and roll-in spread composition in accordance with claim 9, wherein said emulsifier component is a water-in-oil emulsion combination of at least two different emulsifiers selected from the group consisting of lecithin and monoglycerides, the weight ratio of lecithin to monoglycerides being between about 0.5:1 and about 2:1.

14. The combined reduced fat dough and roll-in spread composition in accordance with claim 9, wherein said dough formulation is a substantially fat-free formulation.

15. The combined reduced fat dough and roll-in spread composition in accordance with claim 9, wherein the dough formulation further includes between about 0.5 and about 4% by weight of fat substitute, based upon the total weight of the dough formulation, said fat substitute having no more than about 5% by weight of fat, based on the weight of the fat substitute.

16. The combined reduced fat dough and roll-in spread composition in accordance with claim 9, wherein said dough formulation includes between zero and about 15% by weight shortening, based upon the total weight of the dough formulation.

17. The combined reduced fat dough and roll-in spread composition in accordance with claim 9, wherein said dough formulation includes between about 40 and about 50% by weight of flour, between about 15 and about 30% by weight of water, between zero and about 15% by weight of shortening, and between about 0.5 and about 4% by weight of fat substitute, all based upon the total weight of the dough formulation, said fat substitute having no more than about 5% by weight of fat, based on the weight of the fat substitute.

18. The combined reduced fat dough and roll-in spread in accordance with claim 9, wherein the fat substitute of the composition imparts, in cooperation with other components of the composition, taste acceptance to the composition comparable to that of a full fat composition which is the same as said reduced fat composition except said fat substitute is omitted and the total fat content is at least about 30% by weight greater than said shortening of the reduced fat composition.

19. A combined reduced fat dough and roll-in shortening spread composition including layers of dough formulation having a roll-in shortening spread generally between layers of the dough, the combined composition comprising between about 64 and about 85% by weight of said dough formulation and between about 15 and 36% by weight of said roll-in shortening spread, both based upon the total weight of combined dough and roll-in spread composition;

the roll-in shortening spread being a reduced fat roll-in shortening spread comprising between about 48 and about 65 percent by weight of shortening, based upon the total weight of the shortening spread; between about 0.5 and about 5% by weight of emulsifier, based upon the total weight of the shortening spread; between about 30 to about 47% by weight of water, based upon the total weight of the shortening spread; and said dough formulation includes between about 0.5 and about 4% by weight of fat substitute, based upon the total weight of the dough formulation, said fat substitute being selected from the group consisting of whey protein concentrates, oat fiber derivatives, and combinations thereof and having no more than about 5% by weight fat, based upon the total weight of the fat substitute.

20. The combined reduced fat composition in accordance with claim 19, wherein said dough formulation includes no fat in addition to any present in said fat substitute.

21. A reduced fat baked product prepared from a combined dough and roll-in composition including layers of dough formulation having a roll-in shortening spread generally between layers of the dough, the combined composition comprising between about 64 and about 85% by weight of said dough formulation and between about 15 and 36% by weight of said roll-in shortening spread, both based upon the total weight of combined dough and roll-in spread composition;

the roll-in shortening spread being a reduced fat roll-in shortening spread comprising between about 48 and about 65 percent by weight of shortening, based upon the total weight of the shortening spread; between about 0.5 and about 5% by weight of emulsifier, based upon the total weight of the shortening spread; and between about 30 and about 47% by weight of water, based upon the total weight of the shortening spread; and said combined composition includes between about 0.5 and about 4% by weight of fat substitute, said fat substitute being selected from the group consisting of whey protein concentrates, oat fiber derivatives, and combinations thereof and having no more than about 5% by weight fat, based upon the total weight of said fat substitute; and said baked product is substantially lower in fat than, and exhibits substantially the same eating characteristics as, a full fat baked product prepared from a combined dough and roll-in spread composition having a fat content substantially greater than that of the reduced fat baked product and not including said fat substitute.

22. The reduced fat baked product in accordance with claim 21, wherein the reduced fat baked product has a fat content which is at least about 30% less than the fat content of the full fat baked product.

23. The reduced fat baked product in accordance with claim 21, wherein said emulsifier component is a water-in-oil emulsion combination of at least two different emulsifiers selected from the group consisting of lecithin and monoglycerides, the weight ratio of lecithin to monoglycerides being between about 0.5:1 and about 2:1.

24. The reduced fat baked product in accordance with claim 21, wherein said dough formulation is a substantially fat-free formulation.

* * * * *

UNITED STATES PATENT AND TRADEMARK OFFICE
CERTIFICATE OF CORRECTION

PATENT NO. : 5,395,638
DATED : March 7, 1995
INVENTOR(S) : Frank R. Kincs and Melvin P. Minor It is certified that error appears in the above-indentified patent and that said Letters Patent is hereby corrected as shown below:

```
Col. 2, line 14, replace "bake" with --baked--.
Col. 3, line 10, insert comma --,-- after "dough"; lines 51-52, "must
    reached" should read --must be reached--.
Col. 5, line 50, delete "20"; line 65, delete "be".
Col. 6, lines 33-34, "all subjected" should read --all are subjected--.
Col. 7, line 28, "5%" should read --.5%--.
Col. 10, line 34, "skill" should read --skilled--.
Col. 11, line 44, insert --and-- after "about 30"; line 59, replace
    "roll, in" with --roll-in--.
```

Signed and Sealed this

Eleventh Day of June, 1996

Attest:

BRUCE LEHMAN

Attesting Officer

Commissioner of Patents and Trademarks